United States Patent [19]

von Haas

[11] Patent Number: 4,824,274
[45] Date of Patent: Apr. 25, 1989

[54] COUPLING FOR THE CONNECTION OF A TOOL HEAD AND A TOOL HOLER IN A MACHINE TOOL

[75] Inventor: Rainer von Haas, Geesthacht, Fed. Rep. of Germany

[73] Assignee: Fried. Krupp Gesellschaft mit beschränkter Haftung, Essen, Fed. Rep. of Germany

[21] Appl. No.: 51,631

[22] Filed: May 20, 1987

[30] Foreign Application Priority Data

May 26, 1986 [DE] Fed. Rep. of Germany ....... 3617695

[51] Int. Cl.$^4$ .......................... F16B 1/00; B23B 29/00
[52] U.S. Cl. ...................................... 403/24; 403/322; 409/234; 82/160
[58] Field of Search ................ 407/101, 46; 409/234; 408/238; 82/36 B; 74/89.15; 403/322, 24

[56] References Cited

U.S. PATENT DOCUMENTS 3,483,765  12/1969  Fornataro ...................... 74/89.15 X
4,725,173   2/1988  Hoffman et al. ................ 82/36 B X Primary Examiner—Andrew V. Kundrat
Attorney, Agent, or Firm—Spencer & Frank

[57] ABSTRACT

In a combination including a tool head and a tool holder of a machine tool, the tool head having a shank and an outwardly radially projecting contact collar carried by the shank and the tool holder being formed to have a receiving bore which provides a counterface disposed to cooperate with the contact collar, the combination further including clamping structure for locking the tool head to the tool holder with the contact collar bearing against a selected portion of the counterface, the contact collar and the selected portion of the counterface are cylindrical and, when the contact collar is out of engagement with the counterface, the contact collar has an outer diameter which is slightly greater than the diameter of the selected portion of the counterface for effecting secure clamping of the tool head to the tool holder.

13 Claims, 3 Drawing Sheets

COUPLING FOR THE CONNECTION OF A TOOL HEAD AND A TOOL HOLER IN A MACHINE TOOL

BACKGROUND OF THE INVENTION

The present invention relates to a coupling for the quick connection and release of a tool head relative to a tool holder in machine tools in which the tool head is provided with a shank and an annular contact collar which cooperate with a corresponding receiving bore and an annular counterface in the tool holder, with the tool holder and tool head being locked with the aid of clamping elements actuated by a clamping device so that the contact collar of the tool head lies firmly against an associated counterface in the tool holder.

Various structures have already been proposed to solve the problem of establishing a quick release connection between a tool head and a tool holder in a machine tool. In these structures, the tool head usually has a conical shank which fits into a corresponding receiving bore in the tool holder. After insertion of the conical shank into the receiving bore, the tool head is clamped in with the aid of a suitable clamping device so that it is radially clamped by the conical faces of the receiving bore and the shank and is axially supported at the annular contact collar of the tool holder. However, in the prior art couplings of this type, the use of conical coupling members is a drawback because they involve relatively high manufacturing costs without which the necessary precision and interchangeability of tool head and tool holder are not ensured.

SUMMARY OF THE INVENTION

It is an object of the present invention to provide a coupling device whose radial bearing parts are composed of elements which can also be manufactured without major difficulties by simple and conventional fabricating means. A further object of the invention is to provide a relatively compact structure.

The above and other objects are achieved, according to the invention, in a combination including a tool head and a tool holder of a machine tool, the tool head having a shank and an outwardly radially projecting contact collar carried by the shank and the tool holder being formed to have a receiving bore which provides a counterface disposed to cooperate with the contact collar, the combination further including clamping means for locking the tool head to the too holder with the contact collar bearing against a selected portion of the counterface, by the improvement wherein: the contact collar and the selected portion of the counterface are cylindrical and, when the contact collar is out of engagement with the counterface, the contact collar has an outer diameter which is slightly greater than the diameter of the selected portion of the counterface for effecting secure clamping of the tool head to the tool holder.

Since, according to the invention, the tool head is radially supported in the receiving bore of the tool holder by cylindrical, rather than conical, members, the coupling according to the invention can be manufactured more easily. It is advisable for the over-dimension at the cylindrical collar or collars at the shank of the tool head compared to the counterfaces in the receiving bore of the tool holder to lie between 0.01 and 0.1 mm, depending on the diameter of the tool shank and the diameter of the tool holder in the region of its receiving bore and depending on the material of which the tool holder is made. Such an overdimension is generally sufficient to attain reliable and sufficient clamping of the tool head in the tool holder.

It is of advantage for the radial support of the shank to be provided by two cylindrical collars at the shank of the tool head, with the collar farthest removed from the tool advisably having a smaller diameter than the collar closer to the tool. This facilitates introduction of the shank into the receiving bore.

Since the introduction of the shank of the tool head into the receiving bore of the tool holder causes friction which produces wear, the invention further provides that the faces which slide on one another are coated with a material enhancing slidability, e.g. with a plastic marketed under the trademark Teflon. However, it is particularly advantageous if, according to a further feature of the invention, the cylindrical collars are replaced by balls or rollers which are disposed on the cylindrical shank of the tool head and are retained there by suitable cages. For example, bearing systems could here be employed which are of a type known in the machine construction industry and in the precision tool art as "high precision ball guides". If this feature of the invention is employed, the shank can easily be displaced in the axial direction.

According to a further feature of the invention, the tool head is locked to the tool holder by means of a longitudinally displaceable clamping element which cooperates with radially movable slide members that penetrate into recesses provided in the receiving bore of the tool holder when the clamping element is displaced longitudinally to thus lock the tool head to the tool holder. The longitudinally displaceable clamping element may simply be a spindle which is moved by means of a nut and which itself is advantageously disposed in the tool head itself. This nut may have worm gear teeth on its circumference which are driven by a worm gear mounted in the tool head transversely to the longitudinal direction of the nut. The worm may project laterally from a recess in the tool head and may there be provided with a square profile or a similar shape so that the spindle can be actuated by a suitable key applied laterally on the square profile or the like. When the spindle is moved axially in the direction of the tool head, the tool head is tensioned. If, however, the direction of rotation of the worm gear is changed and the spindle is moved in the opposite direction, the slide elements, when cooperating with sloped spindle faces, are relieved of their load and move in the direction of the center of the axis, thus releasing the tool head and the tool holder.

With a suitable configuration of the end of the spindle opposite the tool head, the latter, if it continues to move longitudinally in the direction toward the tool holder, can be used, after the two members have been released, to push the tool head out of the bore of the tool holder. With its end facing away from the thread, it then abuts against the base face of the receiving bore in the tool holder and then presses the tool head out of the tool holder.

If, conversely, the spindle serving as the clamping element is driven by the tool holder, its end piece can cooperate with a corresponding face on the shank to eject the tool head out of the receiving bore in the tool holder and after release of the radially movable slide elements, is able to push the tool head out of the receiving bore of the tool holder.

Axial movement of the spindle can also be produced by means of an eccentric shaft instead of the worm gear. In this case, the eccentric engages a long hole in the cylindrical portion of the clamping element. With suitable structural design of the eccentric, the axial path of the clamping element can be configured in such a manner that clamping occurs when the eccentric is close to one dead point and in the other dead point the tool head is ejected from the basic holder.

It is of particular advantage for the worm gear or the eccentric employed to drive the longitudinally displaceable clamping element to be disposed in the immediate vicinity of the cylindrical projection with which the tool head and the tool holder can be clamped together radially with respect to one another. In this case, the introduction of the forces required for locking is particularly favorable.

DESCRIPTION OF THE PREFERRED EMBODIMENTS

Figure 1:
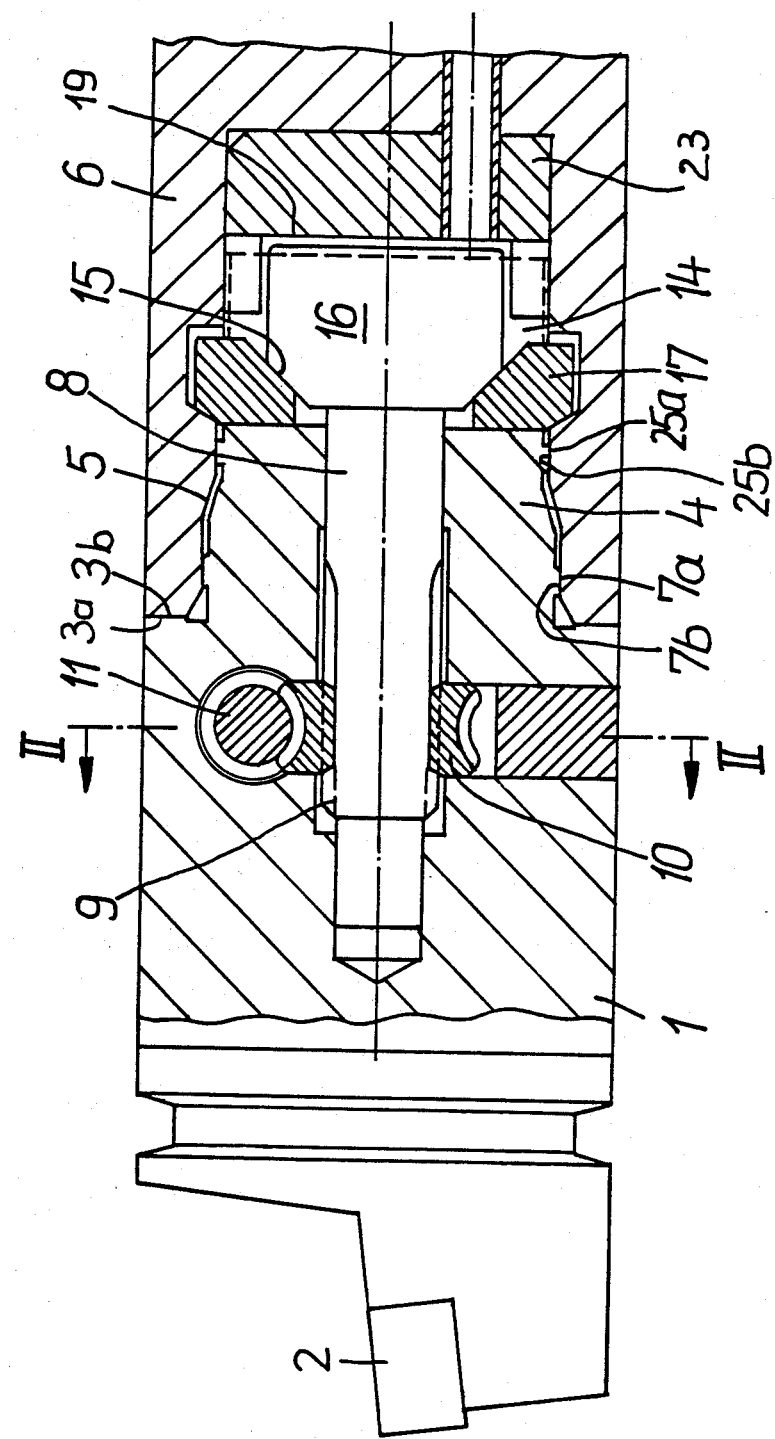
FIG. 1 is a longitudinal cross-sectional view of the coupling between a tool head and a tool holder according to one embodiment of the invention.

The tool head 1 shown in FIG. 1 is equipped with a hard metal cutting plate 2 and has an axial contact collar 3a which cooperates with a corresponding counterface 3b of a tool holder 6 whose frontal part, shown in the drawing, has a cylindrical shape. The shank 4 of tool head 1 fits into a receiving bore 5 in tool holder 6. Shank 4 is radially supported in receiving bore 5 at a corresponding counterface of tool holder 6 via a mating part 7b formed by a cylindrical collar of shank 4, which mating part 7b is of slightly larger diameter than the corresponding mating face 7a of receiving bore 5. Depending on the outer diameter of tool head 1, the thickness of the wall involved and the material employed, this overdimension lies between 0.01 and 0.1 mm.

Shank 4 of tool head 1 may advantageously also be provided with a second mating part 25b formed by a second cylindrical collar. In this case, part 7b closer to tool 2 should have a larger diameter than part 25b disposed at the end of shank 4. Part 25b cooperates with a second mating face 25a of bore 5. Mating part 25b has a diameter which exceeds that of face 25a by an amount corresponding to that set forth above with reference to part 7b and face 7a.

A spindle 8 is mounted in tool head 1 and extends in the longitudinal direction of shank 4. The thread 9 of spindle 8 cooperates with the internal thread of a nut 10 likewise mounted in tool head 1, with the outer face of nut 10 being provided with worm gear teeth which cooperate with a worm gear 11 likewise disposed in tool head 1 and arranged with its longitudinal axis perpendicular to the longitudinal axis of spindle 8.

Figure 2:
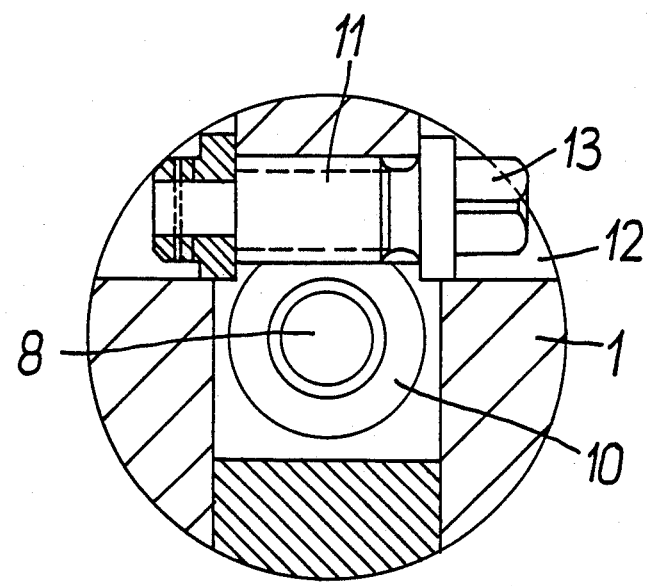
FIG. 2 is a cross-sectional view along line II—II of FIG. 1.

As shown in FIG. 2, worm gear 11 projects laterally from a recess 12 in tool head 1 and is there provided with a square head 13 so that gear 11 can be rotated about its longitudinal axis from that side with the aid of a suitable key or socket. If, for example, referring to FIG. 1, worm gear 11 is turned clockwise, spindle 8 will be displaced to the left and so as to push suitably shaped slide members 17 disposed in a region 14 of receiving bore 5 of tool holder 6 by way of sloped slide faces 15 of a head 16 of spindle 8 into a corresponding recess formed in receiving bore 5 of tool holder 6, thus causing tool head 1 to be locked in tool holder 6 and axial contact collar 3a of tool head 1 to be force locked with the corresponding counterface 3b of tool holder 6.

On the side opposite tool head 1, head 16 is provided with a planar face 19 which, upon movement of spindle 8 in the direction toward tool holder 6, i.e. to the right in FIG. 1, abuts on a base plate 23 in bore 5 of tool holder 6. If spindle 8 is moved further, to the right, tool head 1 and its cylindrical collars are pushed out of receiving bore 5 of tool holder 6.

Figure 3:
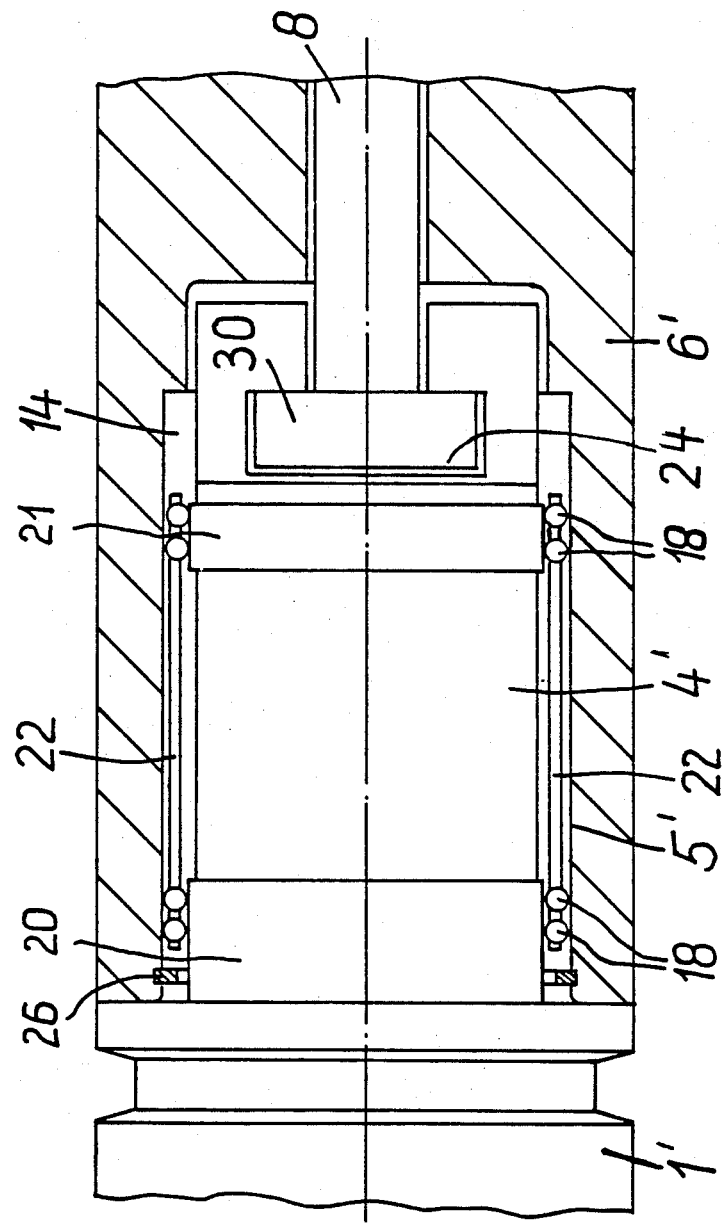
FIG. 3 is a view similar to that of FIG. 1 of a coupling between tool head and tool holder according to the invention in which the radial support of the tool head shank is effected by means of ball bearings.

In the embodiment according to FIG. 3, shank 4' of tool head 1' is supported in receiving bore 5' of tool holder 6' by way of ball bearings 18 supported on cylindrical collars 20 and 21 of shank 4. These ball bearings 18 are interconnected by means of a cage 22 which retains then in their intended positions. Cage 22 and bearings 18 are retained in bore 5' by a retaining ring 26.

Actuation and locking of tool head 1' in tool holder 6' are here effected by way of a spindle 8' mounted in tool holder 6' and equipped with a T-member 30 that is inserted into a corresponding recess provided at the end of the shank of tool head 1'.

Spindle 8' is here actuated by way of tool holder 6' and is therefore not as advantageously manipulated in some cases as the device according to FIG. 1. However, in any case, this embodiment also enables the tool head 1' to be pushed out of the receiving bore of the tool holder when the work is finished in such a manner that further movement of spindle 8', in this case toward the left and toward the tool head, causes base face 24 of T-member 30 to abut on a corresponding counterface of shank 4'. Collars 20 and 21 are overdimensioned relative to balls 18.

The invention now being fully described, it will be apparent to one of ordinary skill in the art that many changes and modifications can be made thereto without departing from the spirit or scope of the invention as set forth herein.

I claim:

1. In a combination including a tool head and a tool holder of a machine tool, the tool head having a shank and an outwardly radially projecting contact collar carried by the shank and the tool holder being formed to have a receiving bore which provides a counterface disposed to cooperate with the contact collar, the combination further including clamping means for locking the tool head to the tool holder with the contact collar bearing against a selected portion of the counterface, the improvement wherein: said contact collar and said selected portion of said counterface are cylindrical and, when said contact collar is out of engagement with said counterface, said contact collar has an outer diameter which is slightly greater than the diameter of said selected portion of said counterface for effecting secure clamping of said tool head to said tool holder; said tool head having a longitudinal axis and said clamping means including clamping members for locking said too head to said tool holder, and a clamping element displaceable along said longitudinal axis and coupled to said clamping members for effecting radial displacement thereof;

and said clamping element being movable in a manner to force said shank out of said bore.

2. The combination defined in claim 1 wherein said tool head has a first end supporting a tool, said tool head has a second contact collar spaced apart from said first-recited collar along said longitudinal axis, said counterface has a second selected portion against which said second contact collar bears when said tool head is locked to said tool holder, and, said collar and selected portion of said counterface which are more remote from the tool have smaller respective diameters than said collar and selected portion of said counterface which are more proximate to the tool.

3. The combination defined in claim 2 wherein, when said second collar is out of engagement with said counterface, said second collar has an outer diameter which is slightly greater than the diameter of said second selected portion of said counterface and the outer diameter of each said contact collar is no more than 0.1 mm greater than the diameter of the corresponding selected portion of said counterface.

4. The combination defined in claim 3 further comprising a ball guide disposed in said bore and defining said counterface for facilitating longitudinal displacement of said tool head relative to said tool holder.

5. The combination defined in claim 1 wherein said clamping element is a spindle centered on said longitudinal axis of said tool head.

6. The combination defined in claim 5 wherein said spindle extends into said tool head and includes a threaded portion and said clamping means further comprise a nut rotatably disposed in said tool head and having an internal thread cooperating with said threaded portion of said spindle, whereby said spindle is displaced along said longitudinal axis of said tool head in response to rotation of said nut.

7. The combination defined in claim 6 wherein said nut has an exterior face provided with a worm gear, and said clamping means further comprise a member disposed in said tool head for rotation about an axis transverse to said longitudinal axis of said tool head and having a worm thread which engages said worm gear for rotating said nut in response to rotation of said member.

8. The combination defined in claim 7 wherein said tool head has an external recess and said member has a square head disposed in said recess and via which said member can be rotated.

9. The combination defined in claim 1 wherein said clamping means further comprise a shaft mounted in said tool head and carrying an eccentric member which cooperates with said clamping element for displacing said clamping element along said longitudinal axis.

10. The combination defined in claim 1 wherein said clamping members are radially movable.

11. In a combination including a tool head and a tool holder of a machine tool, the tool head having a shank and an outwardly radially projecting contact collar carried by the shank and the tool holder being formed to have a receiving bore which provides a counterface disposed to cooperate with the contact collar, the combination further including clamping means for locking the tool head to the tool holder with the contact collar, the combination further including clamping means for locking the tool head to the tool holder with the contact collar bearing against a selected portion of the counterface, the improvement wherein:

said contact collar and said selected portion of said counterface are cylindrical and, when said contact collar is out of engagement with said counterface, said contact collar has an outer diameter which is slightly greater than the diameter of said selected portion of said counterface for effecting secure clamping of said tool head to said tool holder;

said tool head has a longitudinal axis and a first end supporting a tool, said tool head has a second contract collar spaced apart from said first-recited collar along said longitudinal axis, said counterface has a second selected portion against which said second contact collar bears when said tool head is locked to said tool holder, said collar and selected portion of said counterface which are more remote from the tool have smaller respective diameters than said collar and selected portion of said counterface which are more proximate to the tool;

said second collar has, when said second collar is out of engagement with said counterface, an outer diameter which is slightly greater than the diameter of said second selected portion of said counterface and the outer diameter of each said contact collar is no more than 0.1 greater than the diameter of the corresponding selected portion of said counterface; and a ball guide disposed in said bore and defining said counterface for facilitating longitudinal displacement of said tool head relative to said tool holder.

12. In a combination including a tool head and a tool holder of a machine tool, the tool head having a shank and an outwardly radially projecting contact collar carried by the shank and the tool holder being formed to have a receiving bore which provides a counterface disposed to cooperate with the contact collar, the combination further including clamping means for locking the tool head to the tool holder with the contact collar bearing against a selected portion of the counterface, the improvement wherein:

said contact collar and said selected portion of said counterface are cylindrical and, when said contact collar is out of engagement with said counterface, said contact collar has an outer diameter which is slightly greater than the diameter of said selected portion of said counterface for effecting secure clamping of said tool head to said tool holder;

said tool head has a longitudinal axis and said clamping means including radially movable clamping members for locking said tool head to said tool holder, and a clamping element displaceable along said longitudinal axis and coupled to said clamping members for effecting radial displacement thereof;

said clamping element is a spindle centered on said longitudinal axis of said tool head;

said spindle extends into said tool head and includes a threaded portion and said clamping means includes a nut rotatably disposed in said tool head and having an internal thread cooperating with said threaded portion of said spindle, whereby said spindle is displaced along said longitudinal axis of said tool head in response to rotation of said nut;

said nut has an exterior face provided with a worm gear, and said clamping means includes a member disposed in said tool head for rotation about an axis transverse to said longitudinal axis of said tool head and has a worm thread which engages said worm gear for rotating said nut in response to rotation of said member; and said tool head has an external recess and said member has a square head disposed in said recess and via which said member can be rotated.

13. In a combination including a tool head and a tool holder of a machine tool, the tool head having a shank and an outwardly radially projecting contact collar carried by the shank and the tool holder being formed to have a receiving bore which provides a counterface disposed to cooperate with the contact collar, the combination further including clamping means for locking the tool head to the tool holder with the contact collar bearing against a selected portion of the counterface, the improvement wherein:

said contact collar and said selected portion of said counterface are cylindrical and, when said contact collar is out of engagement with said counterface, said contact collar has an outer diameter which is slightly greater than the diameter of said selected portion of said counterface for effecting secure clamping of said tool head to said tool holder;

said tool head has a longitudinal axis and said clamping means includes radially movable clamping members for locking said tool head to said tool holder, and a clamping element displaceable along said longitudinal axis and coupled to said clamping members for effecting radial displacement thereof; and said clamping means includes a shaft mounted in said tool head and carrying an eccentric member which cooperates with said clamping element for displacing said clamping element along said longitudinal axis.

* * * * *